United States Patent
Bazakos et al.

(10) Patent No.: US 7,806,604 B2
(45) Date of Patent: Oct. 5, 2010

(54) FACE DETECTION AND TRACKING IN A WIDE FIELD OF VIEW

(75) Inventors: Michael E. Bazakos, Bloomington, MN (US); Vassilios Morellas, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 677 days.

(21) Appl. No.: 11/163,497

(22) Filed: Oct. 20, 2005

(65) Prior Publication Data

US 2007/0092245 A1 Apr. 26, 2007

(51) Int. Cl.
G03B 17/00 (2006.01)
H04N 7/18 (2006.01)

(52) U.S. Cl. ..................... 396/427; 348/153

(58) Field of Classification Search .............. 396/322, 396/335, 427; 348/143, 153
See application file for complete search history.

(56) References Cited

U.S. PATENT DOCUMENTS

| | | | |
|---|---|---|---|
| 5,396,284 | A | 3/1995 | Freeman |
| 6,049,281 | A | 4/2000 | Osterweil |
| 6,215,519 | B1 | 4/2001 | Nayar et al. |
| 6,370,260 | B1 | 4/2002 | Pavlidis et al. |
| 6,437,819 | B1 | 8/2002 | Loveland |
| 6,445,298 | B1 | 9/2002 | Shepher |
| 6,483,935 | B1 | 11/2002 | Rostami et al. |
| 6,499,025 | B1 | 12/2002 | Horvitz et al. |
| 6,504,482 | B1 | 1/2003 | Mori et al. |
| 6,611,206 | B2 | 8/2003 | Eshelman et al. |
| 6,678,413 | B1 | 1/2004 | Liang et al. |
| 6,714,665 | B1 | 3/2004 | Hanna et al. |
| 6,718,049 | B2 | 4/2004 | Pavlidis et al. |
| 6,738,073 | B2 * | 5/2004 | Park et al. ............ 345/629 |
| 6,970,576 | B1 * | 11/2005 | Tilsley ............ 382/103 |
| 2002/0063711 | A1 | 5/2002 | Park et al. |

(Continued)

FOREIGN PATENT DOCUMENTS

WO 9721188 6/1997

(Continued)

OTHER PUBLICATIONS

Bazakos et al., Fast Access Control Technology Solutions (FACTS), IEEE, pp. 312-317, 2005.

(Continued)

*Primary Examiner*—Rodney E Fuller
(74) *Attorney, Agent, or Firm*—Crompton Seager & Tufte, LLC

(57) ABSTRACT

Facial detection and tracking systems and methods within a wide field of view are disclosed. A facial detection and tracking system in accordance with an illustrative embodiment of the present invention can include a wide field of view camera for detecting and tracking one or more objects within a wider field of view, and at least one narrower field of view camera for obtaining a higher-resolution image of each object located within a subset space of the wider field of view. The wide field of view camera can be operatively coupled to a computer or other such device that determines the subset space location of the individual within the wider field of view, and then tasks one or more of the narrower field of view cameras covering the subset space location to obtain a high-resolution image of the object.

20 Claims, 8 Drawing Sheets

U.S. PATENT DOCUMENTS

| | | |
|---|---|---|
| 2002/0075258 A1 | 6/2002 | Park et al. |
| 2002/0076087 A1 | 6/2002 | You et al. |
| 2002/0105578 A1 | 8/2002 | Hunter |
| 2002/0140822 A1 | 10/2002 | Kahn et al. |
| 2002/0180759 A1 | 12/2002 | Park et al. |
| 2003/0040815 A1 | 2/2003 | Pavlidis |
| 2003/0053658 A1 | 3/2003 | Pavlidis |
| 2003/0053659 A1 | 3/2003 | Pavlidis |
| 2003/0053664 A1 | 3/2003 | Pavlidis et al. |
| 2003/0076417 A1 | 4/2003 | Thomas et al. |
| 2003/0095186 A1 | 5/2003 | Aman et al. |
| 2003/0123703 A1 | 7/2003 | Pavlidis |
| 2003/0209893 A1 | 11/2003 | Breed et al. |
| 2004/0030531 A1 | 2/2004 | Miller |
| 2004/0105004 A1 | 6/2004 | Rui et al. |
| 2004/0240711 A1 | 12/2004 | Hamza et al. |
| 2005/0007450 A1 | 1/2005 | Hill et al. |
| 2005/0055582 A1 | 3/2005 | Bazakos et al. |
| 2005/0110610 A1 | 5/2005 | Bazakos et al. |

OTHER PUBLICATIONS

Kong et al, "Recent advances in visual and infrared face recognition—a review," Elsevier, Science Direct, Computer Vision and Image Understanding 97, pp. 103-135, 2005.
TNO TPD, "Parkeerwachter," Intelligent videosurveillance—AFGOS-SDK, 1 page, 2003.
"Burt Adelson Pyramid," 3 pages, on or before Mar. 4, 2005.
"CBVBS '01 Final Program" 2 pages, 2001.
Albiol et al., "Robust Motion Detection for Video Surveillance Applications," IEEE, International Conference on Image Processing, 5 pages, Sep. 2003.
Burt, et al., "The Laplacian Pyramid as a Compact Image Code," IEEE Transactions on Communications, vol. COM-31, No. 4, pp. 532-540, Apr. 1983.
Caspi, et al., "Alignment of Non-Overlapping Sequences," 8 pages, Oct. 19, 2005.
Chen et al., "Comparison and Combination of Visible and IR Image Face Recognition," 18 pages, Oct. 19, 2005.
Cockshott, et al., "Microscopic Volumetric Image Data Compression Using Vector Quantization and 3D Pyramid," 5 pages, Oct. 19, 2005.
Cutler, "Face Recoginition Using Infrared Images and Eigenfaces," pp. 1-5, Apr. 26, 1996.
Dowdall et al., "A Face Detetion Method Based on Multi-Band Feature Extraction in the Near-IR Spectrum," 9 pages, Oct. 19, 2005.
Dowdall et al., "Face Detection in the Near-IR Spectrum," 15 pages, Oct. 19, 2005.
Fromherz et al., "A Survey of Face Recognition," pp. 1-18.
Gibbons et al., "IrisNet: An Architecture for Internet-Scale Sensing," pp. 1-10, Oct. 19, 2005.
http://esdl.computer.org/comp/proceedings/fg/1996/7713/00/77131082abs.htm, "Comparison of visible and infra-red imagery for face recognition," 1 page, printed Jan. 20, 2004.
http://www.cc.gatech.edu/classes/AY200/cs7495_fall/participants/iwc/paperpres/Visible . . . "Comparison of Visible and Infra-Red Imagery for Face Recognition," 3 pages, printed Jan. 20, 2004.
http://www.merl.com/projects/MultiCamera/, "Multi-Camera Systems," 2 pages, printed Jan. 19, 2004.
Javed, et al., "Knight$^M$: A Real Time Surveillance System for Multiple Overlapping and Non-Overlapping Cameras," 4 pages, Oct. 19, 2005.
Javed, et al., "Tracking Across Multiple Cameras with Disjoint Views," Proceedings of the Ninth IEEE International Conference on Computer Vision, 6 pages, 2003.
Kettnaker, et al., "Bayesian Multi-Camera Surveillance," IEEE, 7 pages, 1999.
Khan, et al., "Consistent Labeling of Tracked Objects in Multiple Cameras with Overlapping Fields of View," 27 pages, Apr. 25, 2002.
Khan, et al., "Human Tracking in Multiple Cameras," 6 pages, Oct. 19, 2005.
Khan, et al., "Tracking in Uncalibrated Cameras with Overlapping Field of View," 8 pages, Oct. 19, 2005.
Kogut, et al., "A Wide Area Tracking System for Vision Sensor Networks," 9th World Congress on Intelligent Transport Systems, 11 pages, 2002.
Morimoto et al., "Pupil Detection and Tracking Using Multiple Light Sources," Image and Vision Computing, 18, pp. 331-335, 2000.
Nath et al., "IrisNet: An Architecture for Enabling Sensor-Enriched Internet Service," pp. 1-15, Dec. 2002.
Pavlidis et al., "A Near-Infrared Fusion Scheme for Automatic Detection of Vehicle Passengers," pp. 1-8, Oct. 19, 2005.
Pavlidis et al., "Urban Surveillance Systems: From the Laboratory to the Commercial World," pp. 1-18, Oct. 19, 2005.
Pavlidis et al., "Automatic Passenger Counting in the High Occupany Vehicle (HOV) Lanes," 19 pages, Oct. 19, 2005.
Porikli, et al., "Multi-Camera Calibration, Object Tracking and Query Generation," Mitsubishi Electric Research Labs, 4 pages, Oct. 19, 2005.
Quian et al., "Structure From Motion Using Sequential Monte Carlo Methods," Kluwer Academic Publishers, pp. 1-54, 2004.
Selinger et al., "Appearance-Based Facial Recognition Using Visible and Thermal Imagery: A Comparative Study," 28 pages, Oct. 19, 2005.
Socolinsky et al., "Illumination Invariant Face Recognition Using Thermal Infrared Imagery," 8 pages, Oct. 19, 2005.
Xu et al., "Pedestrian Detection and Tracking with Night Vision," 10 pages, Oct. 19, 2005.

* cited by examiner

FACE DETECTION AND TRACKING IN A WIDE FIELD OF VIEW

FIELD OF THE INVENTION

The present invention relates generally to the field of face detection and tracking. More specifically, the present invention relates to face detection and tracking in a wide field of view.

BACKGROUND

Surveillance systems are being used with increasing frequency to detect and track individuals within an environment. In security applications, for example, such systems are often employed to detect and track individuals entering or leaving a building facility or security gate, or to monitor individuals within a store, hospital, museum or other such location where the health and/or safety of the occupants may be of concern. More recent trends in the art have focused on the use of facial detection and tracking methods to determine the identity of individuals located within a field of view. In the aviation industry, for example, such systems have been installed in airports to acquire a facial scan of individuals as they pass through various security checkpoints, which are then compared against images contained in a facial image database to determine whether an individual poses a security threat.

Current facial detection and tracking systems typically rely on the use of one or more pan-tilt-zoom (PTZ) cameras to track individuals located within a wide field of view. Such devices can include an optical system operatively coupled to a number of drive motors that permit the operator to zoom-in on the details of an individual, or to monitor a larger area from multiple camera angles. In certain designs, each of the cameras within the system can be connected to a computer equipped with image processing software and/or hardware that can be used to process images received from the cameras in order to detect the identity of the individual.

Due to the high resolution often necessary to accurately detect facial features, many prior-art facial detection and tracking systems lack the ability to both detect and track individuals within a wide field of view while simultaneously acquiring information sufficient to perform facial recognition. In systems employing PTZ cameras, for example, the ability of the camera to effectively track motion within a wide field of view is often limited by the speed and accuracy of the positioning mechanism employed. If, for example, the individual is located within a moving vehicle or is otherwise moving quickly through the image field, such cameras may not be able to adequately cover the entire image field while still providing sufficient resolution to abstract features from the individual's face. In some cases, the inability of the camera to accurate track individuals moving through the image field can also prevent multiple individuals from being detected and/or tracked simultaneously within a wide field of view.

SUMMARY

The present invention relates generally to face detection and tracking systems and methods in a wide field of view. A facial detection and tracking system in accordance with an illustrative embodiment of the present invention can include a wide field of view camera for detecting one or more objects within a wider field of view, and at least one narrower field of view camera for obtaining a higher-resolution image of at least one object located within a subset space of the wider field of view. The narrower field of view cameras can, in some embodiments, be arranged in an array or pattern that, when seamed together, covers the entire field of view without the need for a positioning and/or zoom mechanism. In certain embodiments, the narrower field of view cameras can be overlapped slightly to facilitate the detection of objects moving from one subset space to the next.

In some illustrative embodiments, the face detection and tracking system can employ one or more tri-band imaging (TBI) cameras to detect and analyze various facial features utilizing a combination of low band near-IR light, high band near-IR light, and/or visible light. A near-IR illuminator can be provided to generate near-IR light on the individual, which can then be sensed by the one or more TBI cameras to determine the presence of skin and/or to detect various facial features. In certain embodiments, an adjustment module can also be provided for adjusting the amount of luminance emitted from the near-IR illuminator, if desired.

An illustrative method for detecting and tracking an individual within a wide field of view can include the steps of detecting an object using a wide field of view camera, determining the subset space location of the object within the wide field of view, tasking one or more narrower field of view cameras covering the subset space location to acquire one or more higher-resolution images of the object, and then processing the higher-resolution images to obtain one or more parameters relating to the object. In certain illustrative embodiments, the one or more narrower field of view cameras can be configured to obtain facial images of a tracked individual, which can then be compared against a facial image database to determine the identity of the individual. Various processing routines can be employed to detect and confirm the presence of skin and/or to detect one or more facial features related to the individual.

DETAILED DESCRIPTION

The following description should be read with reference to the drawings, in which like elements in different drawings are numbered in like fashion. The drawings, which are not necessarily to scale, depict illustrative embodiments and are not intended to limit the scope of the invention. Although examples of various steps are illustrated in the various views, those skilled in the art will recognize that the many of the examples provided have suitable alternatives that can be utilized. Moreover, while several illustrative applications are described throughout the disclosure, it should be understood that the present invention could be employed in other applications where facial detection and tracking is desired.

Figure 1:
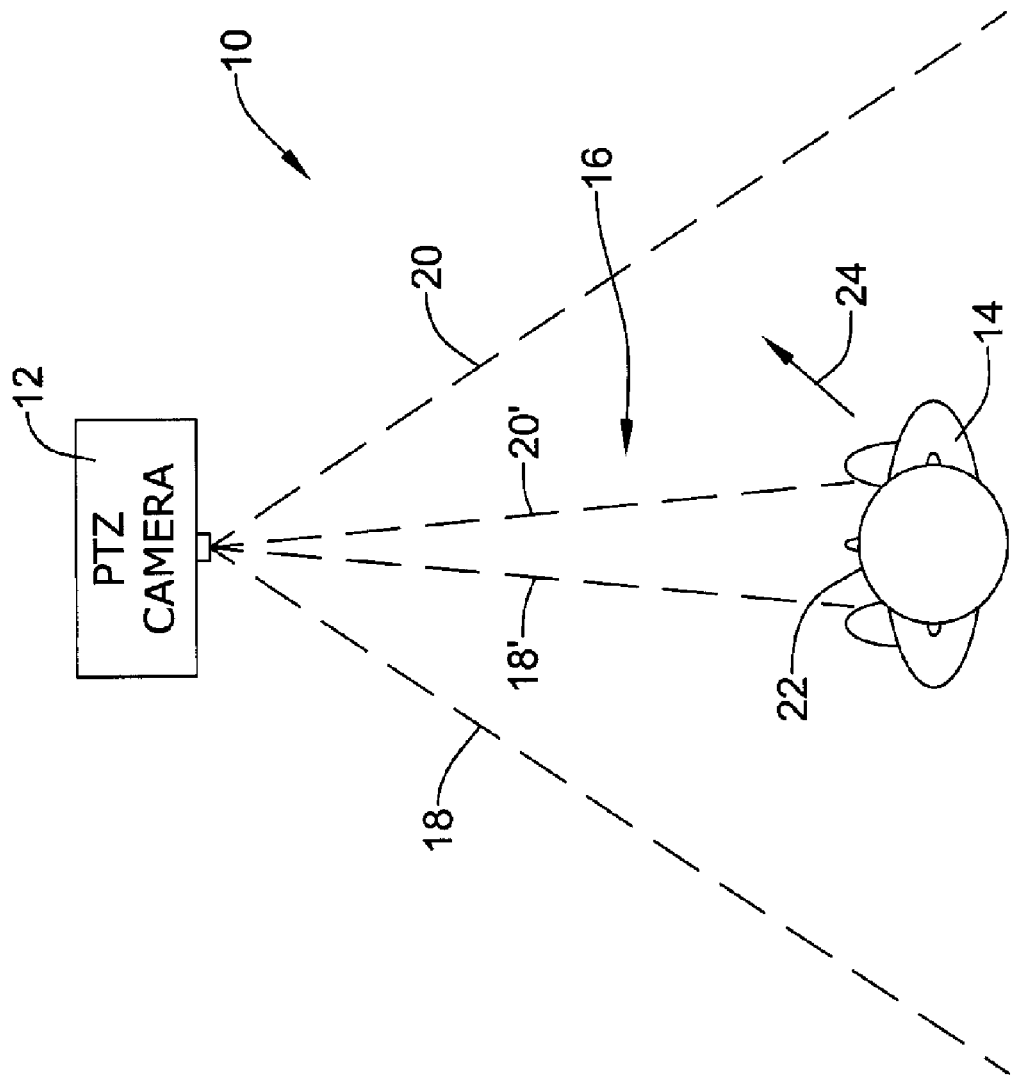
FIG. 1 is a top diagrammatic view of a prior-art facial detection and tracking system employing a conventional PTZ camera.

FIG. 1 is a top diagrammatic view of a prior-art facial detection and tracking system 10 employing a conventional pan-tilt-zoom (PTZ) camera 12. As can be seen in FIG. 1, the PTZ camera 12 can be configured to operate initially in a wide-angle or omni-directional mode to detect and track an individual 14 located within a relatively wide field of view demarcated generally by the space 16 between the dashed lines 18,20. In this mode, the PTZ camera 12 typically provides a low-resolution view of the surrounding environment sufficient to track the general shape of an individual and/or to distinguish the individual from other individuals and/or objects located within the image field.

To detect one or more facial features of the individual 14 as they move through the wide field of view in the general direction indicated, for example, by arrow 24, the PTZ camera 12 can be configured to pan and/or tilt in a direction towards the individual's face 22 and initiate an optical-zoom or telephoto mode, wherein the PTZ camera 12 zooms-in on the area surrounding the individual's face 22. In certain designs, for example, the PTZ camera 12 can include a varifocus optical lens that can be adjusted to concentrate the PTZ camera 12 on a particular space within the wide field of view in order to provide a higher-resolution image of the face 22 sufficient to perform facial recognition of the individual 14. In other designs, digital techniques can also be employed to adjust the resolution of the PTZ camera 12, such as, for example, by altering the resolution of a charge coupled device (CCD) or other such optical device within the PTZ camera 12.

The PTZ camera 12 can be configured to monitor the wide field of view until an object of interest has been detected, or, in the alternative, can be configured to scan various subset spaces within the wide field of view until such motion is detection. In the latter case, the PTZ camera 12 can be programmed to scan an area in some predefined or random path until an object of interest is detected. Once an individual 14 or other object of interest has been detected, the PTZ camera 12 can then be configured to focus on the individual 14 and acquire an image of the individual's face 22 in the higher-resolution, telephoto mode.

Because of the time required for the positioning mechanism to pan and/or tilt towards the individual 14 and to zoom-in on the individual's face 22, many PTZ cameras 12 are limited in their ability track individuals quickly moving through a wide field of view. If, for example, the individual 14 is positioned inside a moving vehicle or is otherwise moving through the image field at a rapid rate, the PTZ camera 12 may not be able to adequately track the individual while still providing a steady image necessary to perform facial recognition. In those systems in which the PTZ camera 12 is configured to scan the environment in a predefined or random path, the particular path traveled by the individual 14 through the wide field of view may even escape detection by the PTZ camera 12 altogether.

As can be further seen by reference to dashed lines 18' and 20' in FIG. 1, the viewing angle of the PTZ camera 12 is significantly diminished when the PTZ camera 12 is focused on the individual's face 22, limiting the ability of the device to detect and/or track other objects of interest within the wider field of view. To compensate for this shortcoming, many prior-art PTZ camera systems must rely on the use of multiple PTZ cameras to detect and track objects within a wide field of view while tasking one or more of the PTZ cameras to acquire information about the individual's identity.

Figure 2:
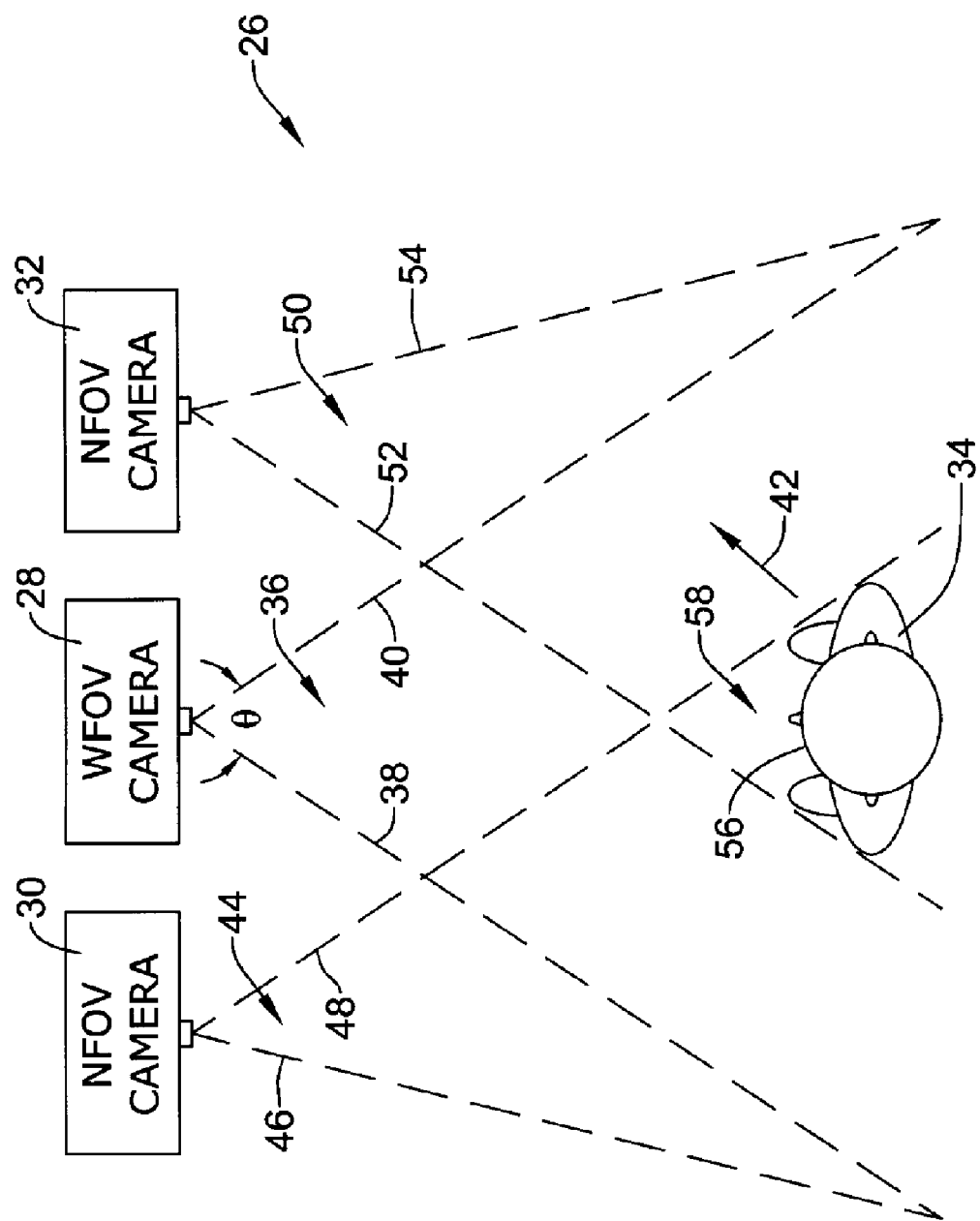
FIG. 2 is a top diagrammatic view of a facial detection and tracking system in accordance with an illustrative embodiment of the present invention.

FIG. 2 is a top diagrammatic view of a facial detection and tracking system 26 in accordance with an illustrative embodiment of the present invention. System 26 includes a wide field of view (WFOV) camera 28 for detecting and tracking individuals and/or other objects of interest located within a wide field of view, and one or more narrower field of view (NFOV) cameras 30,32 that can be used to detect various facial features of an individual 34 in a subset space of the wide field of view. As used herein, the term "wide field of view" connotes a field of view adapted to encompass a particular environment (e.g. a room, hallway, security gate area, etc.), and is not to be construed as having a particular dimension. The dimensions of the wide field of view will, of course, depend on the environment in which the system is employed, and/or the particular application involved.

The wide field of view camera 28 can be configured to continuously operate in a wide-angle mode to constantly track objects of interest within a wide field of view. As can be seen in FIG. 2, for example, the wide field of view camera 28 can be configured to detect and/or track one or more individuals 34 located within a field of view demarcated generally by the space 36 located between dashed lines 38 and 40. Since the wide field of view camera 28 is configured to constantly operate in a wide-angle mode, the individual 34, which is shown in FIG. 2 moving in the general direction indicated by arrow 42, can be tracked in a fixed position without having to employ a pan-tilt-zoom mechanism to move and/or adjust the camera. The ability to track the individual 14 in this manner permits the wide field of view camera 28 to constantly view all objects located within the wide field of view irrespective of their particular location within the space 36.

In certain embodiments, the wide field of view camera 28 can be configured to operate in a low-resolution mode sufficient to detect and/or track an object of interest within the wide field of view while conserving power. The resolution capability of the wide field of view camera will depend on a number of factors, including, for example, the viewing angle of the camera, the pixel density of the optical system employed, and the various characteristics of the surrounding environment. While the illustrative wide field of view camera 28 depicted in FIG. 1 is directional (i.e. having an viewing angle θ less than 360°), it should be understood that the wide field of view camera 28 could comprise an omni-directional camera adapted to acquire images in full 360° space, if desired.

Each of the narrower field of view cameras 30,32 can be directed and/or focused on a subset space of the wide field of view for obtaining a facial-image of the individual. 34. As shown in FIG. 2, for example, the first narrower field of view camera 30 can be configured to acquire facial images of the individual 34 in a first subset space 44 of space 36, as indicated generally by dashed lines 46 and 48. In similar fashion, the second narrower field of view camera 32 can be configured to acquire facial images of the individual 34 in a second subset space 50 of space 36, as indicated generally by dashed lines 52 and 54.

In use, the narrower field of view cameras 30,32 can be configured to provide a higher-resolution image of the individual's face 56 to detect and analyze various facial features of the individual 34 not capable with a wider field of view camera. As with the wide field of view camera 28, each of the narrower field of view cameras 30,32 can be fixed in position, covering a subset field of view that does not change significantly as the individual 34 moves from one field of view to another. In operation, this arrangement permits each narrower field of view camera 30,32 to track the individual 34 without having to first pan, tilt, and/or zoom-in on the individual 34. Moreover, since each of the narrower field of view cameras 30,32 remains fixed during tracking, the ability of the system to accurately track objects of interest is not limited to the accuracy and/or speed of the positioning mechanism employed.

In certain embodiments, the narrower field of view cameras 30,32 can be overlapped slightly to facilitate the detection and tracking of objects as they move from one subset space 44,50 to the next. In the illustrative embodiment of FIG. 2, for example, the first narrower field of view camera 30 is shown overlapped slightly with the second narrower field of view camera 32, forming an overlapping subset space 56 within space 36. When overlapped in this manner, the narrower field of view cameras 30,32 can be tasked to acquire different features of the individual's face 56, which can then be seamed together to form a composite image. If, for example, only a portion of the individual's face 56 is located within the field of view of one of the narrower field of view cameras (e.g. camera 30), the system 26 can be configured to seam the partial image acquired from the other narrower field of camera (e.g. camera 32) into a composite image of the individual 34. Such arrangement could be used, for example, to provide a built-in level of redundancy in the event that one of the narrower field of view cameras 30,32 becomes partially blocked or obscured, or otherwise inoperable.

The various cameras 28,30,32 forming the facial tracking and detection system 26 can be physically separated from each other at various locations within the environment, or can comprise a single camera unit including multiple cameras. In the latter case, for example, each of the cameras 28,30,32 can be disposed within a housing or inset within a wall, ceiling or other desired structure. In the illustrative embodiment of FIG. 2, for example, the two narrower field of view cameras 30,32 are shown arranged in a horizontal array on opposites sides of the wide field of view camera 28, with each camera 28,30,32 being physically separated from each other. It should be understood, however, that the positioning of the cameras 28,30,32 in this manner is not limited as such. As discussed with respect to other embodiments herein, for example, the various cameras 28,30,32 can be arranged in a vertical array, a multi-dimensional array, or some other desired pattern.

While the illustrative embodiment of FIG. 2 shows the use of a single, wide field of view camera 28, it should be understood that multiple wide field of view cameras could be employed, if desired. In certain applications, for example, the use of multiple wide field of view cameras could be employed to extend the overall field of view of the system, or to permit the system to track objects of interest within an area where an obstruction such as a wall or partition may prevent the adequate detection and tracking of objects using a single wide field of view camera.

Figure 3:
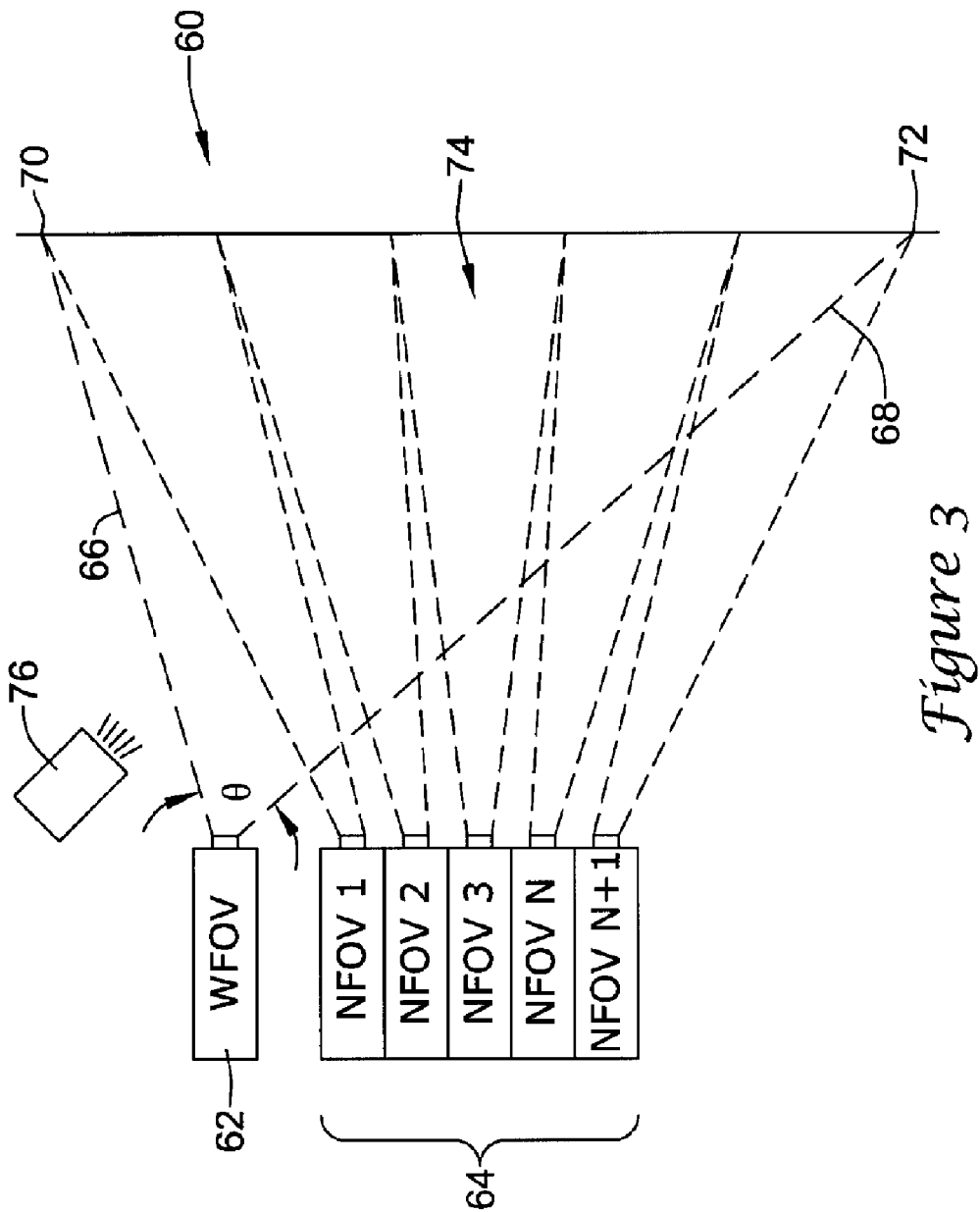
FIG. 3 is a side view of a facial detection and tracking system in accordance with another illustrative embodiment of the present invention employing a vertical array of narrower field of view cameras.

FIG. 3 is a side diagrammatic view of a facial detection and tracking system 60 in accordance with another illustrative embodiment of the present invention employing a vertical array of narrower field of view cameras. As shown in FIG. 3, system 60 can include a wide field of view (WFOV) camera 62, and one or more narrower field of view cameras 64. The wide field of view camera 62 can be configured to continuously operate in a wide-angle mode to constantly track individuals and/or other objects of interest within a wide field of view. As indicated generally by dashed lines 66,68, for example, the wide field of view camera 62 can operate at a relatively wide viewing angle θ that forms a vertical component of the field of view extending downwardly from a first location 70 to a second location 72. Locations 70 and 72, for example, may represent, respectively, the ceiling and floor of a room or other such space to be monitored. In addition to spanning the vertical space between locations 70 and 72, the wide field of view camera 62 can also be configured to scan a horizontal space, similar to that depicted, for example, in FIG. 2.

As can be further seen in FIG. 3, the narrower field of view cameras 62 can be arranged in a vertical array or pattern, forming a number of respective subset spaces 74 within the wide field of view. The narrower field of view cameras 62 can be configured to overlap slightly to facilitate the detection and tracking of objects as they move from one subset space 74 to the next. Alternatively, and as shown in FIG. 3, the narrower field of view cameras can be configured to cover discrete segments within the wide field of view.

In certain embodiments, the narrower field of view cameras 64 can comprise tri-band imaging (TBI) cameras, which use low band near-IR light, high band near-IR light, and visual light to analyze, detect, and match an individual's face. Such devices typically utilize a near-infrared light spectrum to scan facial images by sensing the IR light reflected from the individual's face. The ability to detect such reflected IR light avoids a characteristic problem inherent in many conventional visual spectrum systems, which attempt to analyze non-facial portions of the image during facial recognition. Moreover, since TBI cameras also utilize IR spectrum light to detect the presence of the individual's face, such devices are not as susceptible to environmental conditions such as glare through a window or windshield, inclement weather (e.g. fog, haze, rain, etc.), nighttime conditions, etc. that can affect the ability of the system to acquire clear image signals.

A near-IR illuminator 76 can be provided for generating near-IR light in both the low and high near-IR spectrums, if desired. In certain applications, for example, the near-IR illuminator 76 can be utilized to direct light towards the individual to obtain a clearer image of the individual's face during nighttime, or when other conditions exist. Since the near-IR light is outside of the visible spectrum, such light is not detectable by the naked eye, and therefore does not alert the individual that he or she is being detected and/or tracked.

Figure 4:
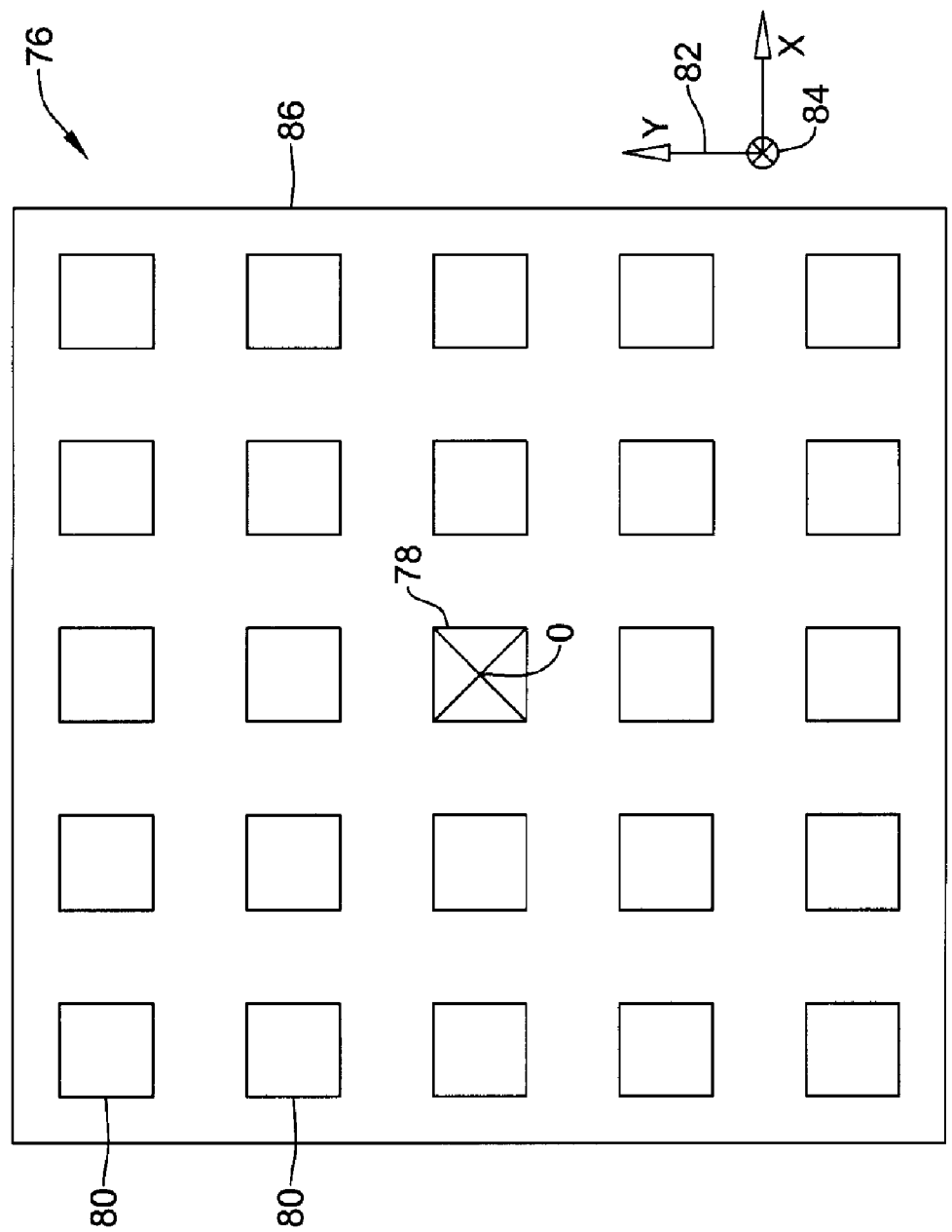
FIG. 4 is a layout view of a facial detection and tracking system in accordance with another illustrative embodiment of the present invention employing a two-dimensional array of narrower field of view cameras.

FIG. 4 is a layout view showing a facial detection and tracking system 76 in accordance with another illustrative embodiment of the present invention employing an X-Y array of narrower field of view cameras. FIG. 4, which may represent, for example, a view of the various camera elements within the system 76 as seen from an observer facing the camera, includes a wide field of view (WFOV) camera 78 for detecting and tracking individuals and/or other objects of interest located within a wide field of view, and a number of narrower field of view (NFOV) cameras 80 that can be used to detect facial features of an individual in various subset spaces within the wide field of view.

As can be seen in FIG. 4, the narrower field of view cameras 80 can be arranged in a multi-dimensional (i.e. X-Y) array, with each camera 80 adapted to cover an associated range of X and Y coordinates within an X-Y coordinate system 82. The Z-axis, which is indicated in coordinate system 84 as a cross 86, may represent the general direction in which the wide field of view camera 78 and narrower field of view cameras 80 are aimed. The wide field of view camera 78 and narrower field of view cameras 80 can be positioned within a camera housing 86 that supports each of the cameras 78,80 in their respective position within the X-Y array. The housing 82 can also contain other components to facilitate detection and tracking of objects, including, for example, a near-IR illuminator, an adjustment module for controlling the level of luminance provided by the near-IR illuminator, a power supply, a processor/controller, etc.

In the illustrative embodiment of FIG. 4, the wide field of view camera 78 is shown positioned centrally at an origin O within the X-Y array. As with other embodiments herein, the wide field of view camera 78 can be configured to continuously operate in a wide-angle mode to constantly track objects of interest within the wide field of view. While the wide field of view camera 78 is shown located centrally within the X-Y array, it should be understood that other embodiments have been envisioned wherein the wide field of view camera is located at some other desired location within the X-Y array, or at a remote location away from the narrower field of view cameras 80. Moreover, while only one wide field of view camera 78 is illustrated, it should be understood that system 76 could employ multiple wide field of view cameras, if desired.

The narrower field of view cameras 80 can each be configured to recognize various facial features within a particular a range of X-coordinates and Y-coordinates that covers a subset space within the wide field of view. In some embodiments, the narrower field of view cameras 80 can be configured to cover the entire space covered by the wide field of view camera 78, allowing the system 76 to acquire higher-resolution images of individuals and/or objects at all locations within the wide field of view. The ranges covered by each narrower field of view camera 80 can be discrete (i.e. with no overlap between adjacent fields), or, in the alternative, can be overlapped by some desired amount. In certain embodiments, each of the narrower field of view camera elements 80 can comprise a tri-band image (TBI) camera or other such device for detecting and analyzing facial features using multiple light spectrums (e.g. near-IR light, visible light, UV light, etc.).

Figure 5:
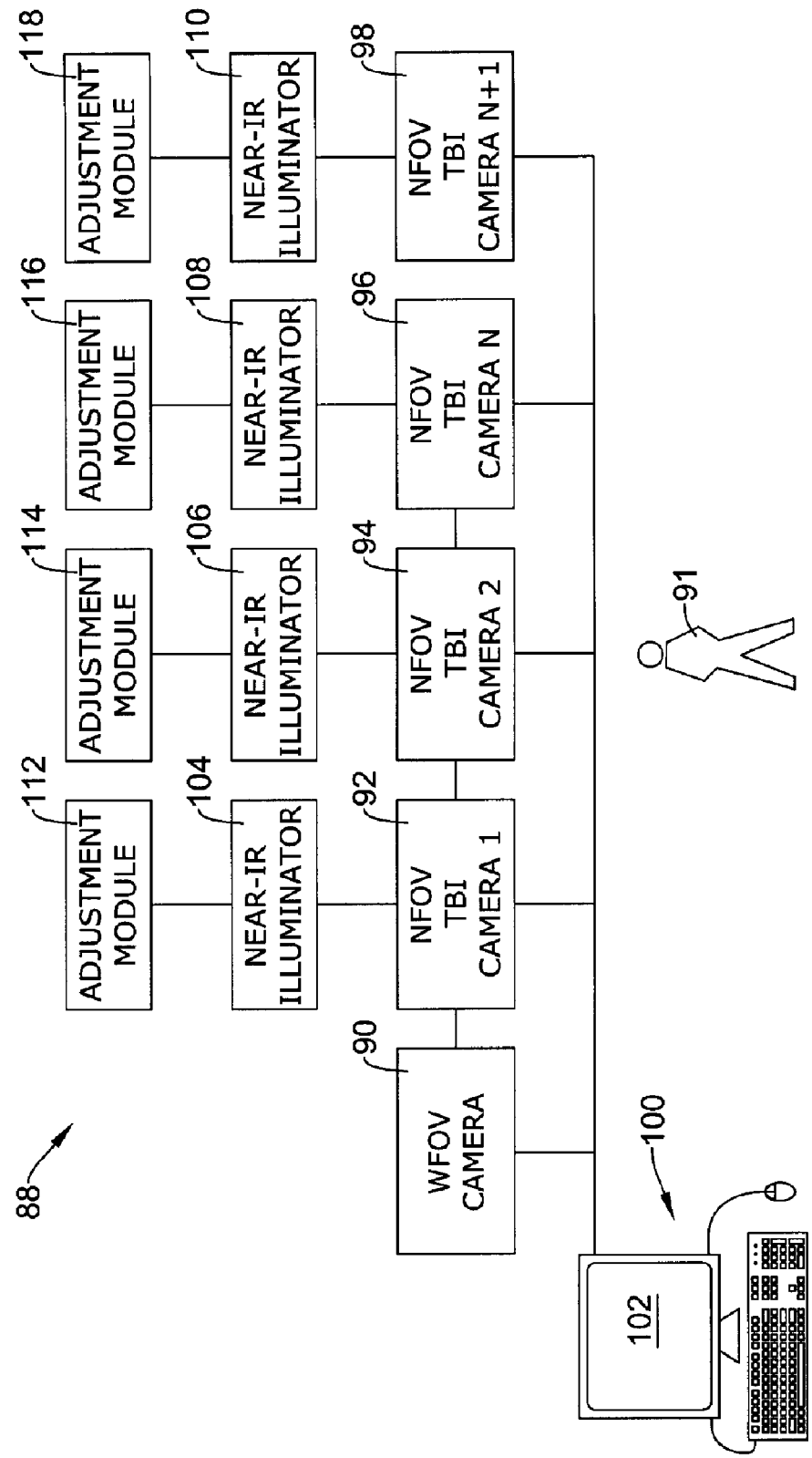
FIG. 5 is a block diagram of a facial detection and tracking system in accordance with another illustrative embodiment of the present invention employing a number of tri-band imaging cameras.

FIG. 5 is a block diagram showing a facial detection and tracking system 88 in accordance with another illustrative embodiment of the present invention employing a number of tri-band imaging cameras. As can be seen in FIG. 5, system 88 can include a wide field of view (WFOV) camera 90 for detecting and tracking one or more individuals 91 within a wide field of view, and a number of narrower field of view TBI cameras 92, 94,96,98 that can be tasked in a desired manner to perform facial recognition on each individual 92 moving through the wide field of view.

The TBI cameras 92,94,96,98 can be configured to operate simultaneously in a coordinated fashion to track and detect individuals 91 as they move from one subset space to the next. As can be seen in FIG. 5, the wide field of view camera 90 and narrower field of view TBI cameras 92,94,96,98 can be operatively connected to a computer 100 or other suitable logic device for analyzing and processing images that can be used to facially recognize each tracked individual 91. The computer 100 can include software and/or hardware that can be used to run one or more routines and/or algorithms therein for controlling and coordinating the operation of the cameras 90,92,94,96,98 in a desired manner. A monitor, screen or other suitable display means 102 can also be provided to display images acquired from the wide field of view camera 90 and/or the narrower field of view cameras 92,94,96,98.

As can be further seen in FIG. 5, each of the narrower field of view cameras 92,94,96,98 can be operatively connected to a respective near-IR illuminator 104,106,108,110, which as described above, can be used to provide luminance on each tracked individual 91 during nighttime, inclement weather, or other such conditions. Each near-IR illuminator 104,106,108, 110 can be connected to a respective adjustment module 112,114,116,118 for adjusting the quality and amount of light emitted from each near-IR illuminator 104,106,108,110 during each successive image capture. While a separate adjustment module 112,114,116,118 is shown provided for each individual near-IR illuminator 104,106,108,110 within the system 88, it should be understood that a single adjustment module could be provided to alter the lighting conditions at multiple cameras, if desired.

The narrower field of view cameras 92,94,96,98 can each be configured to cover a discrete subset space within the wide field of view, or can be overlapped by some desired amount. In the latter case, the narrower field of view cameras 92,94, 96,98 can be tasked to focus on different facial features of the individual 91. In certain embodiments, for example, one of the narrower field of view cameras (e.g. camera 92) could be tasked to provide a general scan of the individual's face whereas an adjacent narrower field of view (e.g. camera 94) could be tasked to provide a retinal scan of the individual 91. The various images acquired by each of the narrower field of view cameras 92,94,96,98 can then be processed via the computer 100 to determine the identity of the individual 91 and/or to computer various other parameter relating to the individual 91 (e.g. velocity, direction of travel, height, orientation, etc.).

Figure 6:
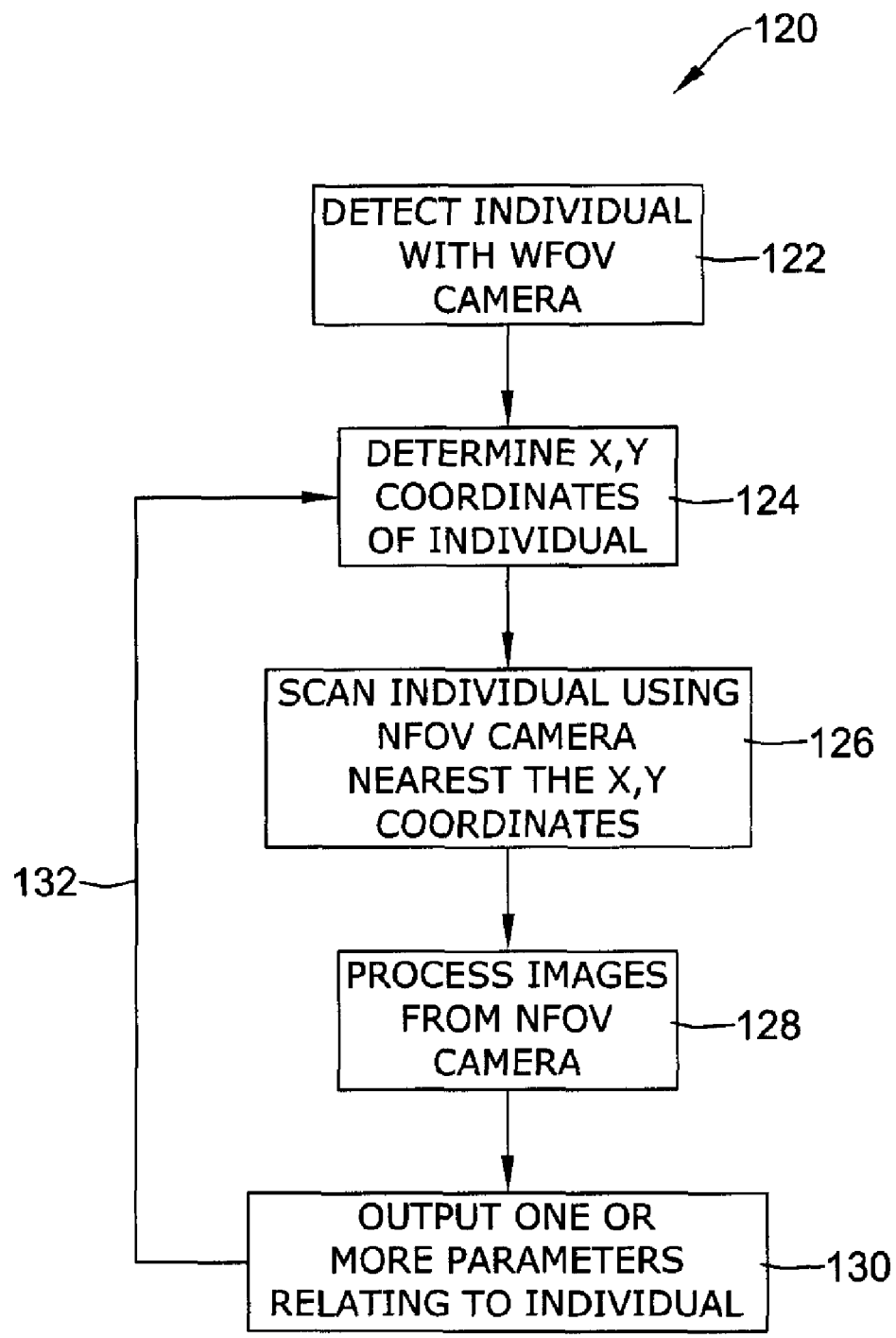
FIG. 6 is a flow chart showing an illustrative method of tracking and detecting one or more objects within a wide field of view.

Turning now to FIG. 6, an illustrative method for detecting and tracking an individual within a wide field of view will now be described with respect to the illustrative system 76 of FIG. 4. The method, represented generally by reference number 120, may begin at block 122, wherein the system 76 initially detects the presence of an individual within a wide field of view using a wide field of view camera 78. Once initially detected, the system 76 can be configured to compute the X and Y coordinates of the individual within the wide field of view, as indicated generally by reference to block 124. A control signal can then be sent to one or more of the narrower field of view cameras 80 located nearest to the computed range of X-Y coordinates, causing those narrower field of view camera(s) 80 to perform a higher-resolution scan of the individual, as indicated generally by reference to block 126.

Once one or more higher-resolution images are obtained from the narrower field of view cameras 80, an image processing routine or algorithm can be initiated to extract various features from the acquired images, as indicated generally by reference to block 128. At this stage, facial features related to the individual's nose, eyes, mouth, skin color, eyebrows, facial size, etc. may be obtained to perform facial recognition on the individual, or to determine some other desired parameter related to the individual. As indicated generally by reference to block 130, one or more parameters relating to the individual can then be outputted and further analyzed, if desired. As indicated generally by return arrow 132, the system 76 can be configured to update the X-Y coordinates and repeat the image processing as the individual moves through the wide field of view, allowing the system 76 to task different narrower field of view cameras 80 to track the individual, if necessary.

Figure 7:
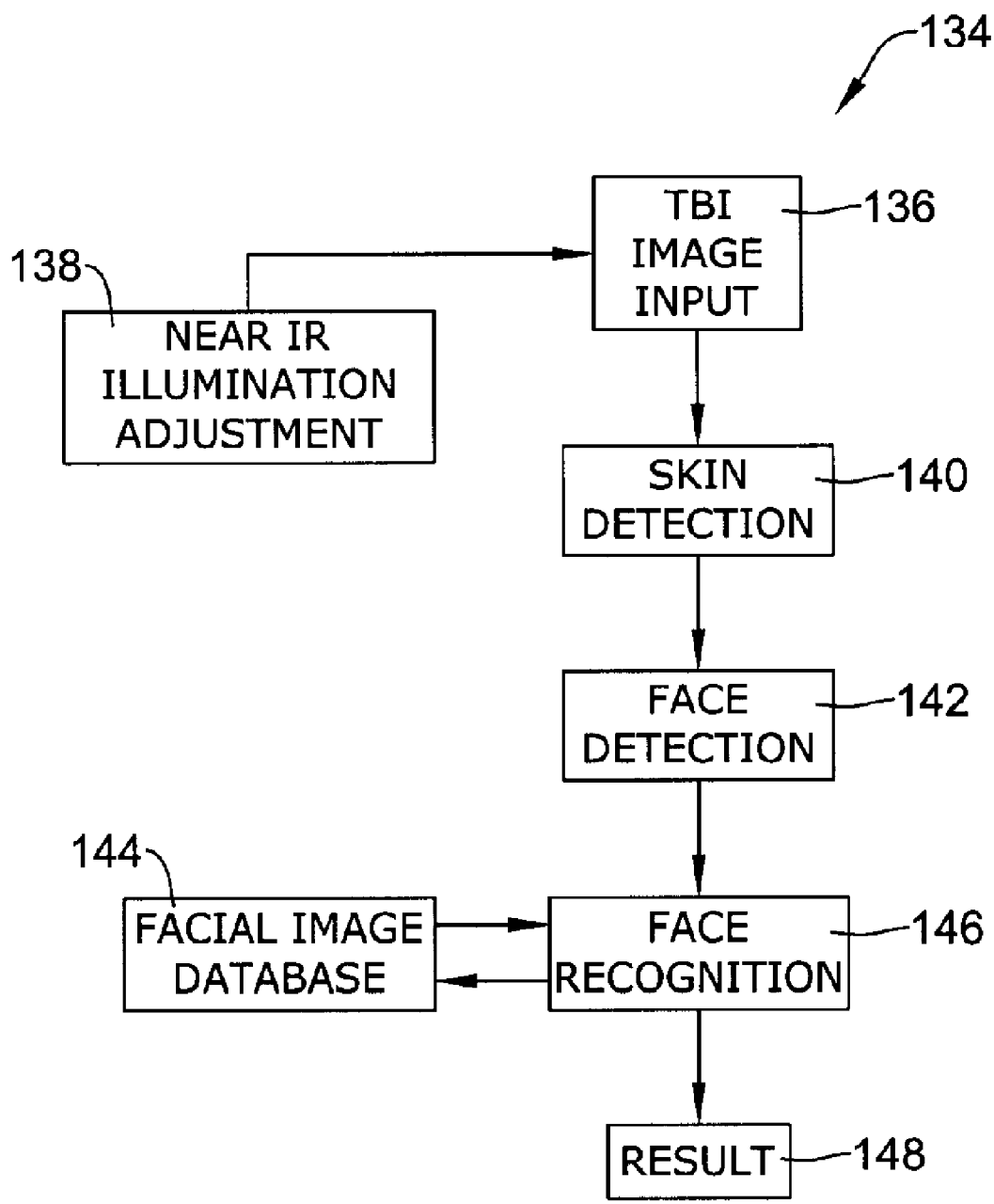
FIG. 7 is a flow chart showing an illustrative method of detecting and tracking an individual within a wide field of view utilizing one or more tri-band imaging cameras.

FIG. 7 is a flow chart illustrating a facial detection and tracking method 134 in accordance with another illustrative embodiment of the present invention utilizing one or more tri-band imaging cameras. As described above, TBI cameras utilize low band near-IR light, high band near-IR light, and visible light to scan and detect an individual's face. Beginning at step 136, one or more of the narrower field of view TBI cameras can be tasked within a wide field of view to acquire an image input containing one or more image frames. Also at this step, and as indicated generally by reference to block 138, the system can be configured to detect the luminance level at the scene and adjust the amount of near-IR illumination provided by each TBI camera, if necessary.

Once an image input is received from each narrower field of view TBI camera, a series of operations can then be performed to isolate the skin in the images from other surface elements, as indicated generally by reference to block 140. Such skin detection step 140, for example, can be performed to verify that the tracked object is not wearing a mask or other such covering that would prevent the system from accurately recognizing the individual's face.

As can be further seen with respect to block 142, a face detection step may also be performed to acquire various facial features that can be later used to determine the identity of the tracked individual as well as other desired parameters relating to the individual. Upon detecting various features of the individual face at step 142, the information obtained can then be compared against a facial image database containing a number of previously stored facial images, as indicated generally by reference to block 144. If a match is found, as indicated generally by reference to block 146, the result can be outputted at block 148, informing the operator that a match has been obtained along with the identification of that individual. Alternatively, if no match is found, the system can be configured to alert the operator that the individual is not recognized within the facial image database.

Figure 8:
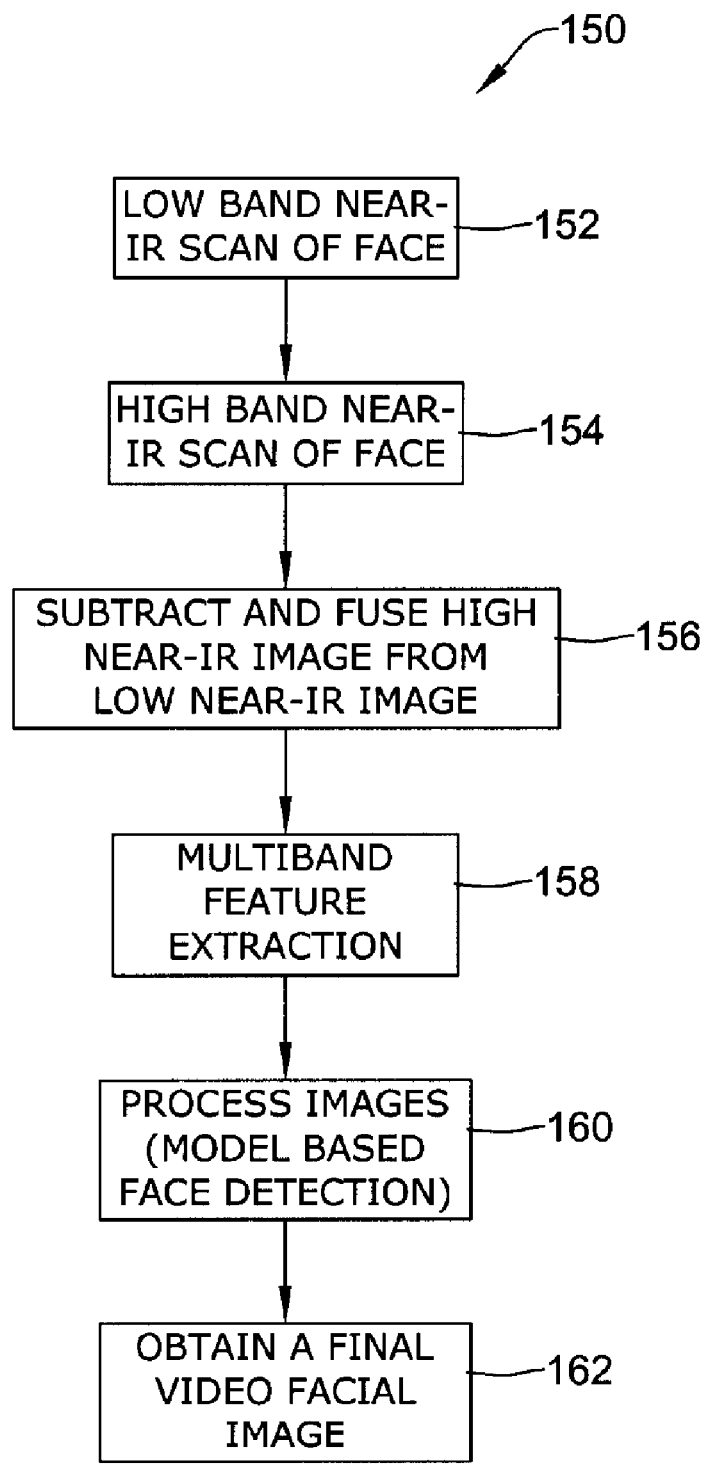
FIG. 8 is a flow chart showing an illustrative method of extracting features from an individual's face using a tri-band imaging camera.

FIG. 8 is a flow chart showing an illustrative method of extracting features from an individual's face using a tri-band imaging system. The method, represented generally by reference number 150, may begin at blocks 152 and 154 with the steps of performing a low band near-IR scan and a high band near-IR scan of the individual's face. The high band near-IR image obtained at block 154 is then subtracted (i.e. weighted) from the low band near-IR image obtained at block 152 to obtain a skin image from the two near-IR images, as indicated generally by reference to block 156. In certain embodiments, for example, the image outputs received by the low band and high band near-IR facial scans can be inputted into a weighted difference software program and/or specialized hardware that fuses the image outputs by performing weighted subtraction of the intensities of the two bands. In use, such fusion of the image outputs intensifies the silhouette of the face and other exposed human skin in the fused image, resulting in a diminution of the background scene covered by the two cameras.

As can be further seen by reference to block 158, one or more feature images can also be extracted from the two near-IR images of steps 152 and 154 using a multi-band feature extraction scheme. In certain embodiments, for example, the two near-IR images obtained from steps 152 and 154 can be utilized in conjunction with visible light, UV light, radar, or some other desired wavelength spectrum to abstract various features from the individual's face (e.g. nose, eyes, mouth, skin color, eyebrows, facial size, etc.) that can be later used to perform facial recognition on the individual.

Next, as indicated generally with reference to block 160, the images acquired from the skin detection step 156 and multi-band feature extraction step 158 can be processed to determine the identity of the individual. In certain embodiments, for example, a series of generalized Hough transforms or model-sized algorithms can be performed, providing an approximation of features such as the location of the eyes, eyebrows, nose, and/or mouth. From this processing step 160, a final video facial image can be produced, as indicated generally by reference to block 162. Other parameters such as the identity of the individual can also be outputted at this step 162, if desired.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A facial detection and tracking system, comprising:
at least one wide field of view TBI camera for detecting one or more objects located within a wider field of view;
two or more narrower field of view TBI cameras for obtaining a higher-resolution image of at least one detected object, each narrower field of view camera adapted to cover a subset space of the wider field of view; and
a near-IR illuminator;
wherein a first narrower field of view camera is configured to capture a first property of the detected object and a second narrow field of view camera is configured to capture a second property of the detected object.

2. The facial detection and tracking system of claim 1, wherein the wide field of view camera continuously operates in a wide-angle mode.

3. The facial detection and tracking system of claim 1, wherein the wide field of view camera is fixed in position.

4. The facial detection and tracking system of claim 1, wherein the wide field of view camera is adjustable in position.

5. The facial detection and tracking system of claim 1, further including an adjustment module for adjusting the light emitted from the near-IR illuminator.

6. The facial detection and tracking system of claim 1, wherein said two or more narrower field of view cameras comprises a plurality of narrower field of view cameras.

7. The facial detection and tracking system of claim 6, wherein each of said plurality of narrower field of view cameras is disposed in an array, wherein the array is a horizontal array, a vertical array, or a two-dimensional array.

8. The facial detection and tracking system of claim 6, wherein said plurality of narrower field of view cameras covers the entire wider field of view in overlapping or discrete segments.

9. The facial detection and tracking system of claim 1, further comprising processing means for processing images received from the wide field of view camera and the at least one narrower field of view camera.

10. The facial detection and tracking system of claim 1, wherein the wide field of view camera is further configured to track movement of the one or more objects within the wider field of view.

11. The facial detection and tracking system of claim 1, wherein at least one of said one or more objects is an individual, and said higher-resolution image is a facial image.

12. A facial detection and tracking system, comprising:
one or more wide field of view TBI cameras adapted to continuously operate in a wide-angle mode, the one or more wide field of view TBI cameras configured to detect and track movement of one or more individuals within a wider field of view;

a plurality of narrower field of view TBI cameras for obtaining a higher-resolution facial image of each detected individual, each narrower field of view camera adapted to cover a subset space of the wider field of view;

a near-IR illuminator;

an adjustment module for adjusting the light emitted from the near-IR illuminator;

a facial image database; and processing means for processing images received from the one or more wide field of view cameras and the narrower field of view cameras, the processing means configured to perform a skin detection routine to detect and confirm the presence of skin, to perform a facial recognition routine to detect one or more facial features of the individual, and to compare the one or more facial features against a set of parameters stored within the facial image database;

wherein a first narrower field of view camera is configured to capture a general scan of an individual's face and a second narrow field of view camera is configured to capture a retinal scan of the individual.

13. A method for detecting and tracking an object within a wide field of view, comprising the steps of:

providing a near-IR illuminator, at least one wide field of view TBI camera, two or more narrower field of view TBI cameras, and a processor;

illuminating the wide field of view using the near-IR illuminator;

detecting an object within the wide field of view using the at least one wide field of view TBI camera;

the processor determining the subset space location of the object;

the processor tasking a first TBI camera of the two or more narrower field of view TBI cameras covering the subset space location to scan one or more higher-resolution images of the object of a first feature;

the processor tasking a second TBI camera of the two or more narrower field of view TBI cameras covering the subset space location to scan one or more higher-resolution images of the object of a second feature; and the processor processing the images received from the one or more narrower field of view cameras to obtain at least one parameter relating to the object.

14. The method of claim 13, wherein said object is an individual.

15. The method of claim 14, wherein said processing step includes the step of performing a skin detection routine to detect and confirm the presence of skin.

16. The method of claim 14, wherein said processing step includes the steps of:

performing a facial recognition routine to detect one or more facial features of the individual; and comparing the one or more facial features against a set of parameters stored within a facial image database.

17. The method of claim 14, further comprising the processor tasking the one or more narrower field of view TBI cameras covering the subset space location to perform a low band and high band near-IR scan of the individual's face;

the processor subtracting and fusing the high near-IR image from the low near-IR image;

the processor performing a multi-band feature extraction routine to detect one or more facial features of the individual; and the processor processing the images to obtain a final video facial image.

18. The method of claim 17, further comprising the step of the processor comparing the one or more facial features against a set of parameters stored within a facial image database.

19. The method of claim 17, further including the step of the processor adjusting the quality or amount of near-IR light emitted during the step of tasking one or more narrower field of view TBI cameras covering the subset space location to scan one or more higher-resolution images of the individual.

20. The method of claim 13, further including the step of the processor adjusting the quality and/or amount of near-IR light emitted during the step of tasking one or more narrower field of view TBI cameras covering the subset space location to scan one or more higher-resolution images of the object.

\* \* \* \* \*